United States Patent [19]

Wehner

[11] Patent Number: 4,851,848
[45] Date of Patent: Jul. 25, 1989

[54] FREQUENCY AGILE SYNTHETIC APERTURE RADAR

[75] Inventor: Donald R. Wehner, San Diego, Calif.

[73] Assignee: The United States of America as represented by the Secretary of the Navy, Washington, D.C.

[21] Appl. No.: 151,042

[22] Filed: Feb. 1, 1988

[51] Int. Cl.[4] .......................... G01S 13/90; G01S 7/42
[52] U.S. Cl. ...................... 342/25; 342/179; 342/201
[58] Field of Search ................. 342/25, 179, 191, 129, 342/131, 201; 367/88

[56] References Cited

U.S. PATENT DOCUMENTS

| | | | |
|---|---|---|---|
| 4,084,158 | 4/1978 | Slawsby | 343/5 CM |
| 4,101,891 | 7/1978 | Jain et al. | 342/25 |
| 4,150,376 | 4/1979 | Blythe et al. | 343/5 CM |
| 4,183,024 | 1/1980 | Brooks | 343/5 CM |
| 4,292,634 | 9/1981 | Wu et al. | 343/5 CM |
| 4,325,065 | 4/1982 | Caputi, Jr. | 343/5 CM |
| 4,339,752 | 7/1982 | Williams et al. | 343/5 CM |
| 4,450,444 | 5/1984 | Wehner et al. | 342/25 |

Primary Examiner—Thomas H. Tarcza
Assistant Examiner—Gilberto Barrón, Jr.
Attorney, Agent, or Firm—Harvey Fendelman; Thomas G. Keough

[57] ABSTRACT

A radar transmission, reception and signal processing system generates high resolution synthetic aperture radar ground maps from air or space platforms using waveforms in which frequency is changed pulse-to-pulse. The transmitted radar signal is comprised of a series N bursts with n pulses per burst wherein each of the pulses is a fixed frequency step, $\Delta f$, either above or below one or the other of the n pulses, i.e. the n pulses comprises an ordered set and further, preferably, wherein the set of n pulses is arranged in time as a random permutation of the ordered set. In each of the k sample gates for each burst the n complex samples of reflectivity are inverse Fourier transformed from frequency domain samples of reflectivity to synthetic range domain profiles to result in an array of aligned range profiles in each of k coarse range delay positions. Azimuth or cross-range processing is accomplished by convolving complex range data appearing in each synthetic range cell with a suitable azimuth reference to result in a set of complex numbers that represent complex reflectivity maps of the earth's surface in that coarse range bin.

"Zoom" capability is achieved by discrete Fourier transforming the data in each synthetic range cell of the selected delay. "Zoom" is achieved by increasing the target dwell time and simultaneously increasing the radar signal bandwidth.

In both the spotlight "zoom" mode and the SAR mode, the processed data is converted from complex numbers to absolute magnitudes before display.

9 Claims, 14 Drawing Sheets

FREQUENCY AGILE SYNTHETIC APERTURE RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of radar mapping and specifically to synthetic aperture radar mapping techniques for generating high resolution maps of surface targets and terrain.

Synthetic Aperture Radar (SAR) is an airborne or spaceborne radar mapping technique for generating high-resolution maps of surface target areas and terrain. The first experimental demonstration of SAR mapping occurred in 1953 when a strip map of a section of Key West, Fla., was generated by frequency analysis of data collected at 3 cm wavelengths from a C-46 aircraft by a group from the University of Illinois. Synthetic aperture radar is used to obtain fine resolution in both slant-range and cross-range. Cross-range resolution refers to resolution transverse to the radar line of sight. The term slant range refers to line-of-sight range to distinguish from cross-range. Resolution in the slant-range to the radar is often obtained by coding the transmitted pulse, typically by FM chirp coding. Cross-range resolution is obtained by coherently integrating echo energy reflected from the ground as the aircraft or spacecraft carrying the radar travels above and alongside the illuminated area to be mapped.

The term synthetic aperture refers to the distance that the radar travels during the time that reflectivity data are collected from a point to be resolved on the earth's surface that remains illuminated by the real antenna beam. Length of the synthetic aperture of a side-looking SAR is the groundtrack distance over which coherent integration occurs. Synthetic length depends on antenna beamwidth and varies with range delay. Synthetic-aperture length in the sidelooking case shrinks for echoes arriving from points closer to the radar and increases for echoes arriving from points farther from the radar. The effect for ideal processing is to produce constant cross-range resolution vs. range. Cross-range resolution is approximately equal to the real aperture's cross-range dimension. FIG. 1 illustrates a sidelooking SAR configuration.

In FIG. 1 aircraft 10 has a sidelooking radar (not shown) that generates a beam 12. The beam 12 has a real antenna beamwidth 14 and there is associated therewith a processed swath width 16 as well as synthetic aperture lengths 18 and 20 at the near and far ranges of the swath width, respectively. In the example illustrated in FIG. 1 the aircraft 10 and associated radar fly along ground track direction 22.

Echo energy collected during illumination of each resolution element of the area to be mapped is made to arrive in phase at the output of the radar processor in order to realize the narrow beamwidth associated with the long synthetically generated aperture. This is achieved by first correcting out all motion of the aircraft that deviated from straight-line motion. At this point the SAR processing is "unfocussed". Then, for "focussed" SAR, the "quadratic" phase error is corrected. Quadratic phase error is produced by straight-line motion of the radar past each point of the mapped area.

It is possible to achieve a second form of SAR, sometimes called "spotlight SAR," illustrated in FIG. 2, in which the radar antenna (not shown) aboard aircraft 10 tracks a particular target area 24 of interest over some azimuth, or cross-range, angle $\Delta\phi$. Here, the cross-range resolution is limited, not by antenna size as for sidelooking SAR, but by target dwell time. Synthetic-aperture length for small $\Delta\phi$ can be thought of as the tangential distance the radar travels while moving through the angle $\Delta\phi$ to the target.

A third type of SAR is achieved by integrating echo energy as the antenna is scanned in azimuth. This is called "Doppler beam sharpening." Here, for constant azimuth scan rate, relatively long integration time will occur at portions of the scan angle near the direction of platform motion compared to near broadside portions of the scan. This tends to produce constant cross-path resolution and effectively sharpens the real antenna beam.

Some fundamental characteristics of the sidelooking SAR concept can be been explained in terms of equi-range and equi-Doppler lines on the earth's surface to be mapped by a moving radar platform above the earth. As shown in FIG. 3 equi-range lines on the earth's surface are the intersections with the earth's surface of successive concentric spheres centered at the radar. Points on each of these spheres are equidistant from the radar. Equi-Doppler lines 26 on the earth's surface are produced by intersections with the earth's surface of coaxial cones, which are concentric about the flight line 28 of the radar platform 30 as the axis and the radar position as the apex of the cones. Points on each of these cones appear at constant velocity relative to the radar. The zero-velocity cone is a plane perpendicular to the line of flight through the radar's position. The cones for maximum and minimum velocity are straight lines on the flight axis extending ahead or behind the radar, respectively. A flat-earth surface results in a coordinate system made up of the families of the concentric circles and hyperbolas shown in FIG. 3.

At any instant, the radar is able to view that portion of the range/Doppler coordinate system illuminated by the real antenna beam. The distribution of echo power from the illuminated area 32, as a function range delay and Doppler, is the SAR image for the area. Brightness of an image pixel is proportional to the echo power from the corresponding range/Doppler cell on the earth's surface. Mapping resolution is determined by the ability of the radar to measure differential range delay and differential Doppler. Resolution, ideally, is independent of radar range but the image will degrade as thermal or other noise sources begin to determine pixel brightness at low echo signal levels.

A real aperture sidelooking radar is shown in FIG. 4. A real aperture radar maps by resolving in range using relatively short pulses or pulse compression and in azimuth using a long aperture facing off the side of the aircraft.

The echo energy from any element of the area to be mapped must arrive in phase to the radar processor, as in the real aperture radar, in order to realize the narrow beamwidth associated with a long synthetically generated aperture. This is achieved by first correcting out all motion of the aircraft which deviates from straight line motion. Then, the quadratic error may also be corrected. Quadratic error is produced by straight-line motion of the radar past each element, which results in a range change to each element of the mapped area. Processes for correcting out this error are well known and are more fully described in *HIGH RESOLUTION RADAR*, by Donald R. Wehner, published March, 1987, hereby incorporated by reference in its entirety.

Present implementations of all SARs involve some means for pulse compression to obtain the high resolution in slant-range. Pulse compression techniques require wide instantaneous bandwidth throughout the entire radar system which may limit resolution. Large phase steered arrays for space and airborne applications cannot support large bandwidths without costly and lossy linear delay sections to produce true time delay beam steering. Thus, present SAR capabilities and techniques are precluded for use for these systems. Flexible, variable resolution "zoom" capabilities are not now possible with present SAR techniques. Resolution can only be changed in steps, a separate pulse compression waveform for each step being required. Finally, both resolution and dynamic range are limited by digital conversion due to the analog-to-digital conversion speed limitations.

SUMMARY OF THE INVENTION

The present invention overcomes the foregoing limitations with present SAR techniques by providing a system and technique whereby the slant-range resolution is obtained using a frequency agile waveform which is not limited by either the radar's instantaneous bandwidth or by analog-to-digital conversion speeds. Although the radar must still be able to operate over wide bandwidth, actual instantaneous bandwidth may be quite narrow. The present invention also has the capability that resolution may be continuously varied to achieve any degree of "zooming" within its maximum operating band limitation.

The foregoing is accomplished by a SAR system that generates SAR images using frequency agility to replace pulse compression to obtain resolution synthetically in the range dimension. Cross-range resolution for each synthetic range cell in the present invention is obtained by coherently processing phase history in each synthetic range cell that was generated during the target dwell time. Slant-range resolution, in contrast to that for pulse compression SAR, is obtained synthetically from target echo spectra by use of a discrete Fourier transform. Thus, in accordance with the present invention frequency agile sidelooking SAR images are generated in each of a set of coarse range bins from the phase corrected data using an inverse discrete Fourier transform of the complex frequency-domain samples collected in the coarse range cell and obtained during each stepped-frequency burst yielding the complex synthetic range profile, and correlation with a suitable azimuth reference of the Doppler time history response in each range synthetic cell yielding a compressed azimuth profile. Additionally, "zooming" capability is achieved by the present invention by interrupting the sidelooking SAR mode to adjust the agility bandwidth and the target dwell time in a spotlight mode. Adjustment of agility bandwidth changes range resolution and adjustment of dwell time changes cross-range resolution. Dwell time is adjusted by angle tracking the area to be zoomed. By adjusting the agility bandwidth in concert with the dwell time, "square" resolution is possible wherein cross-range and slant-range resolution are equal. Cross-range resolution in the "zooming" mode is obtained by discrete Fourier transformation of the Doppler time history response in each synthetic range cell. One high resolution image pixel is generated on the average, for each low resolution (coarse range) cell obtained from each pulse. For example, for a pulse repetition frequency of 2000 pps and using 50 low resolution range cells, there would be $50 \times 2000 = 10^5$ image pixels produced per second.

The frequency agile process of the present invention involves generating synthetic slant-range profiles based on the transmission of a coherent pulse-to-pulse frequency stepped waveform in a continuous series of bursts, with n pulses per burst. The sampled echo signal data are coherently processed as in-phase and quadrature components, which are the equivalent of a complex signal representation of the amplitude and phase angle of the waveform. The n complex quantities obtained from the response to a burst from one coarse range position constitute the frequency domain samples for that coarse range cell. The inverse Fourier transform of this spectral data yields the n element synthetic range profile in that coarse range cell. In order that this process be effective, it is necessary that the radar, target geometry and the target reflectivity be relatively constant over the time duration associated with a transmitted burst.

OBJECTS OF THE INVENTION

Accordingly, it is the primary object of the present invention to disclose a SAR radar capable of performing radar mapping with a wide variety of radar types on air and space platforms.

It is a further object of the present invention to disclose a SAR radar that achieves high slant-range resolution that is not limited by the radar's instantaneous bandwidth or by analog-to-digital conversion speeds.

It is a still further object of the preset invention to disclose a radar in which radar bandwidth may be continuously varied to achieve any degree of resolution within its maximum operating band limitation.

A still further object of the present invention is to disclose a SAR radar that can achieve "zooming" against spotlighted target areas.

These and other objects of the invention will become more readily apparent from the ensuing specification and claims when taken in conjunction with the attached drawings.

DESCRIPTION OF THE PREFERRED EMBODIMENT

Figure 5:
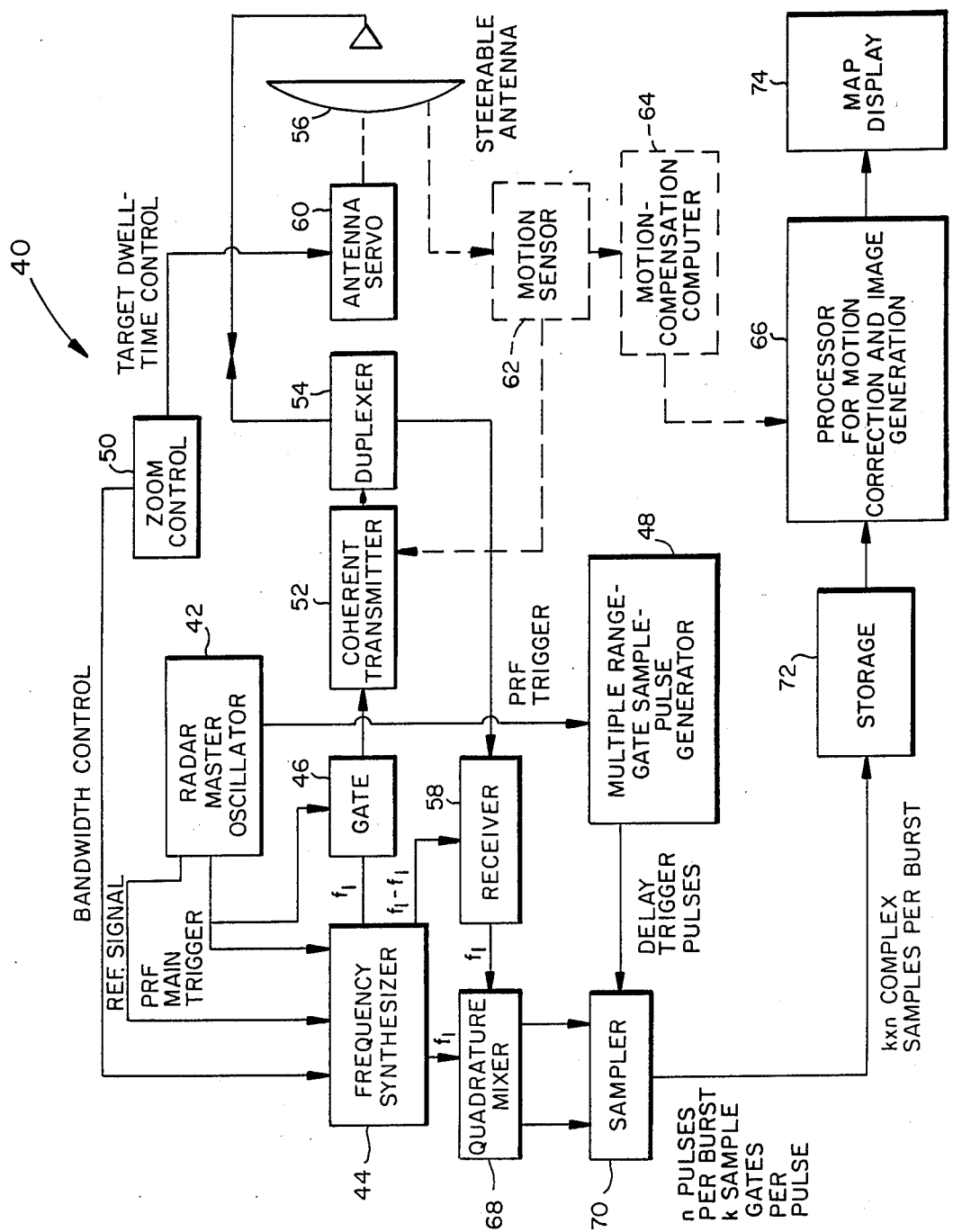
FIG. 5 is a block diagram of the frequency agile SAR radar of the present invention.
Figure 6A:
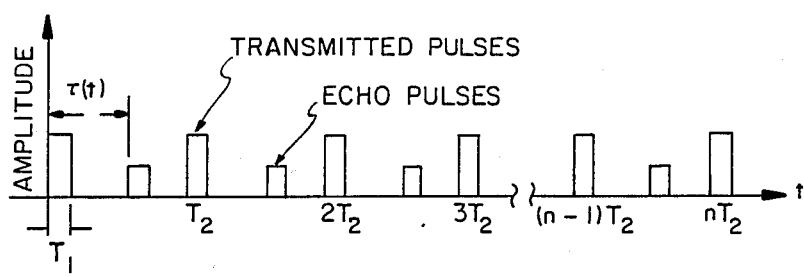
FIG. 6a is a graph of the transmitted pulses in relationship to the echo pulses in accordance with the present invention.
Figure 6B:
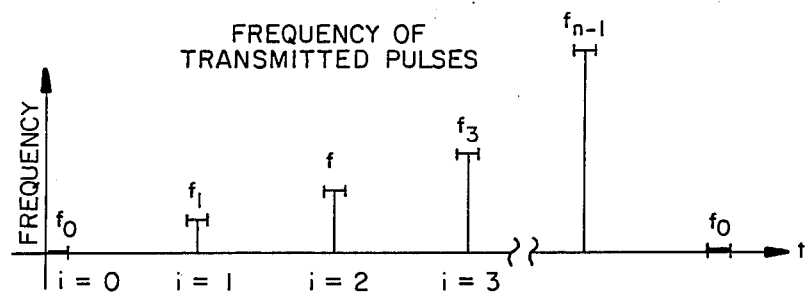
FIG. 6b is a graph of the frequency of the transmitted pulses in accordance with the present invention.

Referring to FIG. 5 there is illustrated the frequency agile SAR system of 40 of the present invention.

Radar master oscillator 42 is the stable reference source for the entire radar system 40. The stable source 42 generates a reference signal, typically 10KHz, to the frequency synthesizer 44. Master oscillator 42 also generates triggers at the radar pulse repetition frequency (PRF) using standard techniques. Triggers at the appropriate delay relative to the main trigger are supplied to the frequency synthesizer 44, the gate network 46 and the multiple range gate sample pulse generator 48.

Frequency synthesizer 44 generates a contiguous set of waveform segments with segment length $T_2$ and frequency $f_i = f_0 + i\Delta f$ where $f_0$ is a fixed stable reference, $\Delta f$ is a fixed frequency step size and i is an integer. The stable frequency $f_0$ is derived from the master oscillator 42 as is well known. The frequency segments may be arranged sequentially within each burst so as to form a discrete version of an analog linear FM (chirp) signal within each burst. Alternatively, a random or pseudo random arrangement of the above described set of frequency segments can also be used to obtain improved electronic counter countermeasures. Where a random arrangement of the above set of frequency segments is utilized, the set of frequency segments that are used would constitute a random permutation of the ordered set of frequency segments in each burst. FIG. 6a, 6b, 7a and 7b illustrate the periodic waveform, i.e. the set of pulses derived from the above described frequency segments following the triggering of gate 46 as is described below. As can be seen in these figures each burst is comprised of the set of pulses $f_0$ through $f_{n-1}$, that each pulse has a width of $T_1$ and that the pulses are separated by the time interval $T_2$. Each burst is thus $nT_2$ seconds long where n is the number of different frequency pulses per burst.

Figure 7A:
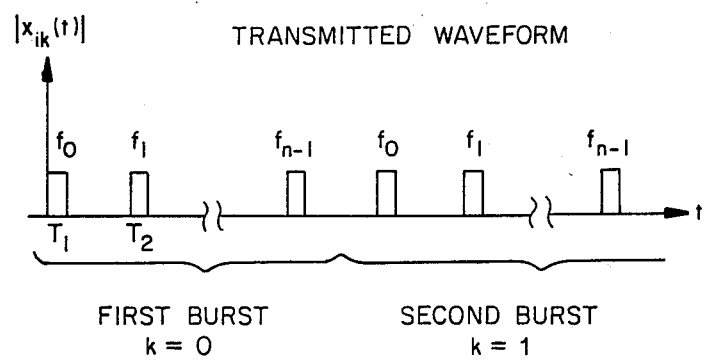
FIG. 7a is a graph of the transmitted waveform in accordance with the present invention.
Figure 7B:
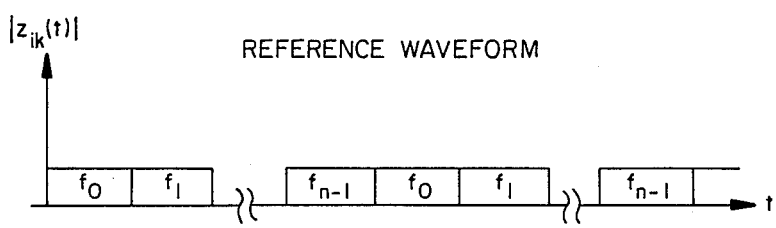
FIG. 7b is a graph of the reference waveforms in accordance with the present invention.

The frequency synthesizer 44 generates the reference waveforms illustrated in FIG. 7b. The transmitted waveform illustrated in FIG. 7a comprises the radar signal that is formed by gate 46. The frequency synthesizer 44 generates the reference waveforms by converting the stable reference signal from the master oscillator 42 to the desired frequency on command within, for example, 5 μs. This is achieved by known techniques using combinations of RF mixing for frequency addition and subtraction and RF frequency multiplication and division. It is not required that a known phase relationship exist from frequency to frequency. In the embodiment of the present invention where random or pseudo random permutations of the set of pulses comprising each burst are utilized it is required that a previously generated frequency be regenerated in phase after one or more additional frequencies have been generated. In other words, a previously generated frequency may need to be restored as though it had never been turned off. This can be accomplished by utilizing an array of frequency synthesizers as would be readily understood by one of ordinary skill in this art.

Inputs to the frequency synthesizer 44 are thus the pulse repetition rate trigger from the radar master oscillator 42, i.e. PRF main trigger, the reference signal from the radar master oscillator 42 and the bandwidth control from zoom control network 50 to be described. The main trigger triggers the synthesizer 44 to change frequency each pulse repetition interval (PRI) thus producing the above frequency segments of a length equal to the radar pulse repetition interval $T_2$. The input from the zoom control 50 adjusts the minimum frequency step size so that the total bandwidth of the transmitted radar signal is increased or decreased to result in a processed range resolution approximately equal to the cross-range resolution produced when the radar antenna tracks a target of interest in the spotlight zoom mode.

The signal into gate 46 is the contiguous, periodic set of frequency segments generated by the frequency synthesizer, i.e. $z_{ik}(t)$ shown in FIG. 7b. On command from the main trigger produced by master oscillator 42, the gate 46 gates outputs a signal of length $T_1$ from each segment of the synthesizer output so that the contiguous train of frequency segments is converted into a continuous train of pulses, $x_{ik}(t)$ as is shown in FIG. 7a to be power amplified and then transmitted via coherent transmitter 52, duplexer 54 and radiating antenna 56. The pulse train is typically a low duty cycle train in that the pulse width $T_1$ is much less than the pulse repetition interval $T_2$. However, use of high duty cycle or contiguous transmission of pulse segments is within the scope of the present invention.

Coherent transmitter 52 amplifies the low level RF output pulses from gate 46 and thereby generates high power pulses to be radiated via duplexer 54 by antenna 56. The coherent transmitter 52 may be comprised of conventional transmitters such as solid state power amplifiers to obtain several watts of power followed by a traveling wave tube (TWT) amplifier to boost the power. Bandwidth of the amplifiers used in the transmitter 52 must be able to operate at the required carrier frequency, typically 1.0 GHz to 35 GHz, and required, bandwidth, typically 100 MHz to 500 MHz, with less than approximately 5 degrees phase and approximately 1.0 dB amplitude ripple across the band. Amplitude and phase ripple requirements can be relaxed by correcting received data based on known deviation from flat amplitude response and deviation from linear frequency response over the band.

Duplexer 54 may be comprised of a conventional duplexer which allows the full transmitter pulse power to be transmitted from the transmitter 52 to the antenna 56 while providing sufficient attenuation of the transmitted signal to protect the delicate receiver 58 and which allows received signal power from the antenna 56 to arrive with very little attenuation at the receiver 58 during the off time of the transmitter 52. The duplexer 54 must be able to operate at the transmitted frequency and bandwidth with phase and amplitude ripple specifications similar to those of the transmitter 52.

The antenna 56 is driven with high power pulses from the duplexer 54. Radiated power in the SAR mapping mode is directed to the side of the radar platform at a desired fixed squint angle from the platform's velocity vector. In the spotlight zoom mode the antenna 56 is squinted to track a desired target of interest. The antenna design may be conventional. In accordance with the present invention, conventional phase array techniques may be used for phase steering in the zoom mode. This becomes possible by adjusting antenna 56 phase shifters from pulse to pulse.

Antenna servo mechanism 60 steers the antenna in the spotlight zoom mode or, alternatively, sets the squint angle in the mapping mode using inputs from the zoom control in either case. For a mechanically steered antenna, the servo may be comprised of conventional feedback antenna servo systems using synchro sensors. For phase steering, the antenna servo 60 develops space commands from the zoom control to the individual antenna phase shifters.

Zoom control 50 sets the radar bandwidth and dwell time to produce "square" resolution, i.e. equal resolution in range and azimuth (cross-range). In the mapping mode the zoom control 50 commands the antenna servo 60 to direct the antenna to a fixed squint angle. The radar bandwidth is then set to produce a processed range resolution that is determined by the squint angle over which data is processed from point targets on the ground. In the sidelooking SAR mode processed azimuth angle is limited to antenna azimuth beamwidth. In the zoom mode the zoom control 50 commands the servo 60 to spotlight a fixed ground location for high resolution imaging for a specified dwell interval. Zoom control 50 then also sets the total bandwidth of frequencies generated for the transmitted waveform.

Motion sensor 62 senses the cross-track acceleration of the platform and transmits the information to the motion compensation computer 64 as is well known. In another implementation, the motion sensor 62 output may control the phase through the transmitter to correct the cross-track motion of the platform. In both cases, conventional accelerometer designs can be used.

The motion compensation computer 64 converts output signals from the motion sensor into cross-track motion correction data for the processors 66. For each frequency step i the motion compensation computer 64 generates the in-phase and quadrature-phase equivalents of the phase associated with the complex correction factor:

$$\pounds = \exp\left\{j(-2\pi f_i)\left[\frac{2\widetilde{v}_t}{c}\left(iT_2 + \frac{T_1}{2} + \frac{2\widetilde{R}}{c}\right)\right]\right\}$$

where
$f_i$ is the transmitted frequency at step i
$\widetilde{v}_t$ is the cross-track velocity
$\widetilde{R}$ is the range to the spotlight area in the spotlight mode or range corresponding to the sampled range gate in the mapping mode.
c is propagation velocity
$T_2$ is the radar pulse repetition interval and
$T_1$ is the pulse width.

Receiver 58 is a conventional receiver that provides preamplification and superheterodyne amplification of the frequency hopping received signal from the duplex receiver 58 output port. The receiver bandwidth is set to about $1/T_1$. Following broadband preamplification, down conversion to a constant intermediate frequency $f_I$ is achieved at each frequency by mixing the preamplified signal with the signal from the frequency synthesizer 44 at $f_i - f_I$. $f_i$ is the frequency of the received pulse which is known based on the frequency code within each burst.

Quadrature mixer 68 is a conventional quadrature mixer that performs sychronous detection of each received pulse at the intermediate frequency $f_I$ with the reference signal from the synthesizer 44 to produce an in-phase and quadrature-phase pair, as is well known, which is the complex reflectivity of the illuminated area at the transmitted pulse frequency $f_i$. Quadrature outputs for a burst of n pulses at frequencies $f_o$ to $f_{n-1}$, respectively, comprise n frequency domain reflectivity values at each sample gate delay position, which represent the frequency domain response for that burst in each course range bin.

Figure 8:
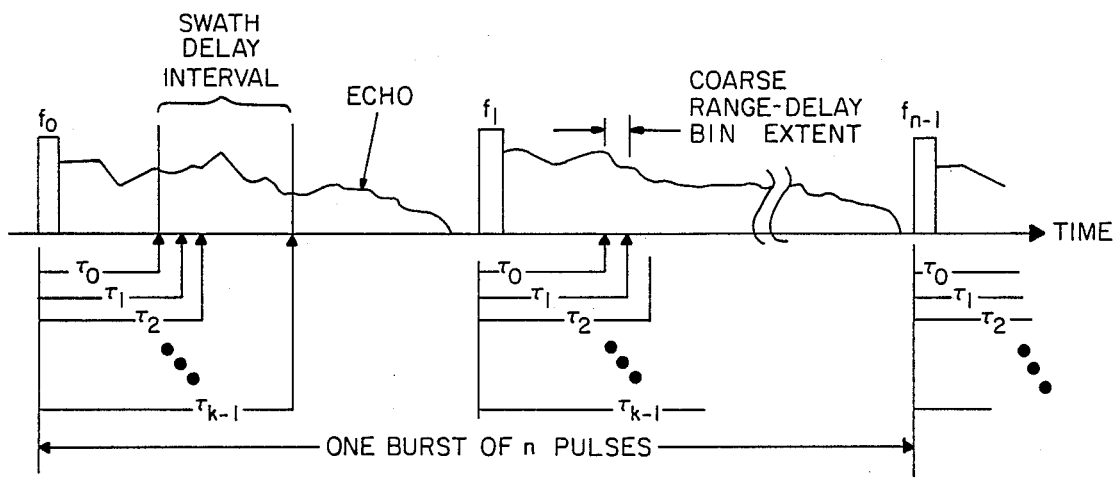
FIG. 8 is a graph of the frequency agile SAR sampling according to the present invention.
Figure 9:
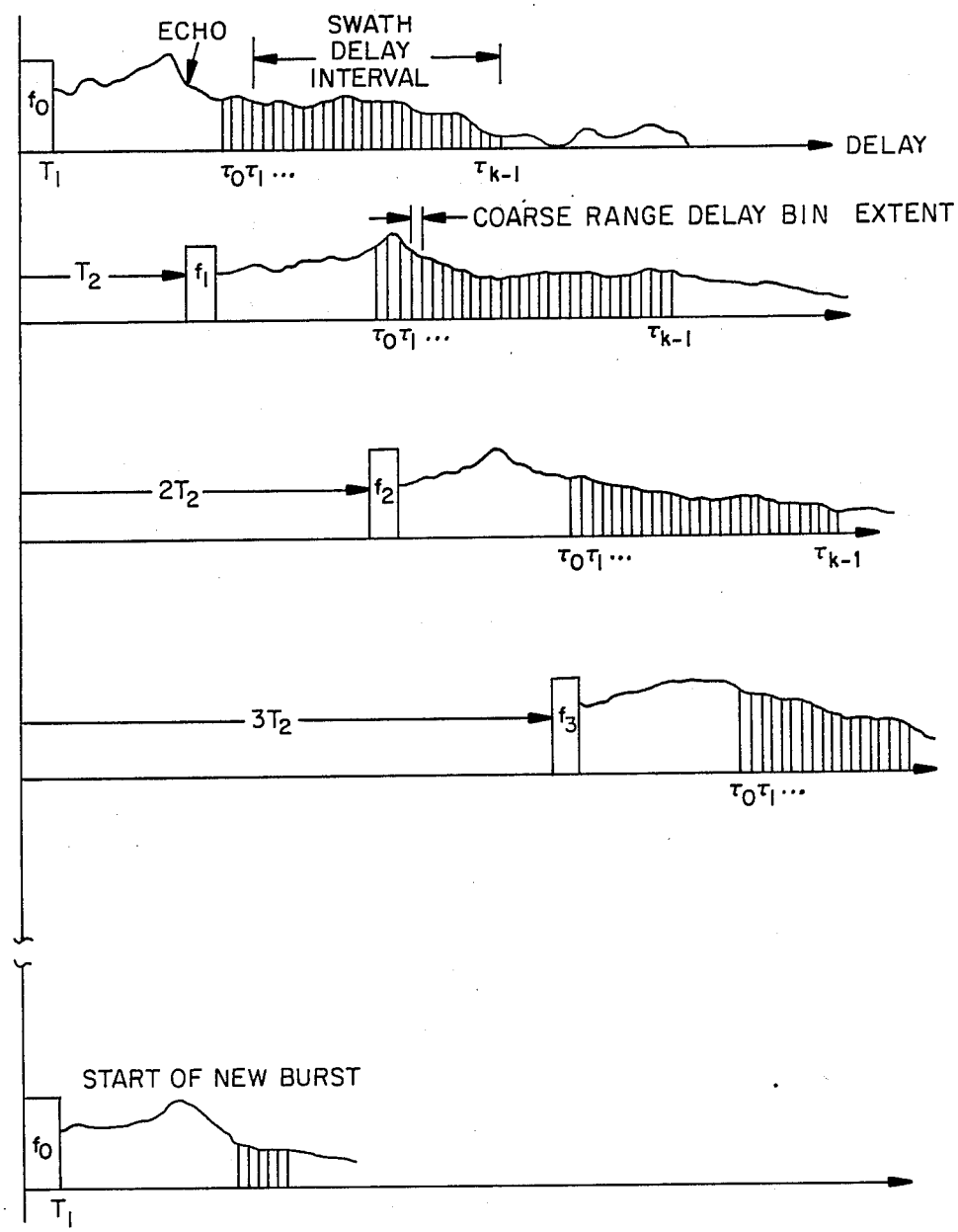
FIG. 9 is a graph of the frequency agile SAR transmit and echo ambiguous range sampling according to the present invention.

The multiple range gate sample pulse generator 48 generates sample gates at which quadrature outputs are sampled. Two modes are possible as is indicated in FIGS. 8 and 9. In each mode a series of delay triggers are generated following each transmit main trigger pulse. In the spotlight zoom mode only one gate is sampled at the range delay associated with the target area to be imaged. As is illustrated in FIG. 8 data from each pulse is sampled after echoes produced by the previous pulse have died out. This mode constitutes unambiguous ranging. Alternatively, as is illustrated in FIG. 9 echoes are sampled before echoes produced by the previous pulse have died out. This mode constitutes ambiguous ranging. In this mode, a random or pseudo random permutation of the pulses in each burst is utilized and, thereby, echoes from the previous pulse are filtered out by the receiver 58 because adjacent pulses will, in all probability, be separated in frequency. The method illustrated in FIG. 9 allows a high effective Doppler sampling rate which is required for larger beam widths, longer ranges, higher frequencies and higher platform speeds.

Sampler 70 is comprised of conventional in-phase (I) and quadrature-phase (Q) sample and hold circuits followed by an analog-to-digital converter. Quadrature outputs from the quadrature mixer 68 are sampled in each range gate following each transmitted pulse as is indicated in FIGS. 8 and 9. Triggering for each range gate is provided by the delay trigger pulses from the range gate sample pulse generator 48. Although, the radar bandwidth may be high enough to provide high resolution in the spotlight zoom mode, the analog-to-digital converter of the sampler 70 operates at a relatively low rate. Thus the analog-to-digital converter dynamic range may remain relatively high. For example, to obtain a two foot range resolution, an approximate bandwidth of 250 MHz would be required. Sampling rate in the zoom mode, however, would be determined not by radar bandwidth but by pulse repetition frequency which may typically be 10 KHz (in the ambiguous range mode illustrated in FIG. 9). Dynamic range, i.e. the ability to avoid saturation and resolve small targets near large targets might typically be 12 to 14 bits per byte (72 to 84 dB).

Storage network 72 may be comprised of any of several types of conventional digital storage devices and is used to store the lower case kxn complex samples per burst. If processing is carried out in real-time on the platform, buffer storage would be used to store N bursts of data for each image frame.

Processor 66 is used for performing motion correction calculations and for generating image data. The processor 66 uses the correction factor f obtained from the motion compensation computer 64 to multiple each of kxn complex samples per burst. This step may be avoided if the platform motion is compensated by adjusting phase of the coherent transmitter as is well known. In each of the k sample gates for each burst in the SAR mapping mode, the n complex samples of reflectivity are inverse Fourier transformed from sets of frequency domain samples of reflectivity to synthetic range domain profiles of equivalent length $c/(2\Delta f)$ meters. In the zoom mode only one gate (coarse range bin) is processed. This completes the range processing. The result in the SAR mapping mode is an array of aligned range profiles in each of the k course range delay positions. These profiles are produced as the sidelooking beam sweeps past the terrain to be mapped. The number of range profiles in each coarse range delay position which can be processed coherently into a SAR strip map depend on the burst rate, the range to the sample gate, antenna azimuth beamwidth and platform speed. Burst rate must be high enough to sample the Doppler bandwidth produced by ground return across the beam at the range corresponding to the sample gate to be processed.

Azimuth or cross-range processing is carried out over the number N of bursts corresponding to a cross-range extent of up to the cross-range extent of the antenna beam at the range corresponding to the sample gate (coarse range bin) from which a SAR strip map is to be generated. Maximum azimuth resolution occurs when data is processed over the entire azimuth beamwidth. Azimuth processing in the SAR mode in each coarse range bin is done by correlating complex range data appearing in each synthetic range cell in a conventional manner with a suitable azimuth reference. The result in each coarse range bin is a set of complex numbers that represent complex reflectivity maps of the earth's surface in that coarse range. In the zoom mode azimuth processing is carried out by discrete Fourier transforming the data in each synthetic range cell of the selected delay. In the zoom mode the azimuth lines extend to lengths corresponding to the target dwell time during which the desired ground area is spotlighted. For both the zoom mode and the SAR mode, the processed data is converted from complex numbers to absolute magnitudes before display on map display 74.

Referring now to FIGS. 10 through 17 collectively, details of the signal processing technique of the present invention will be described.

Figure 1:
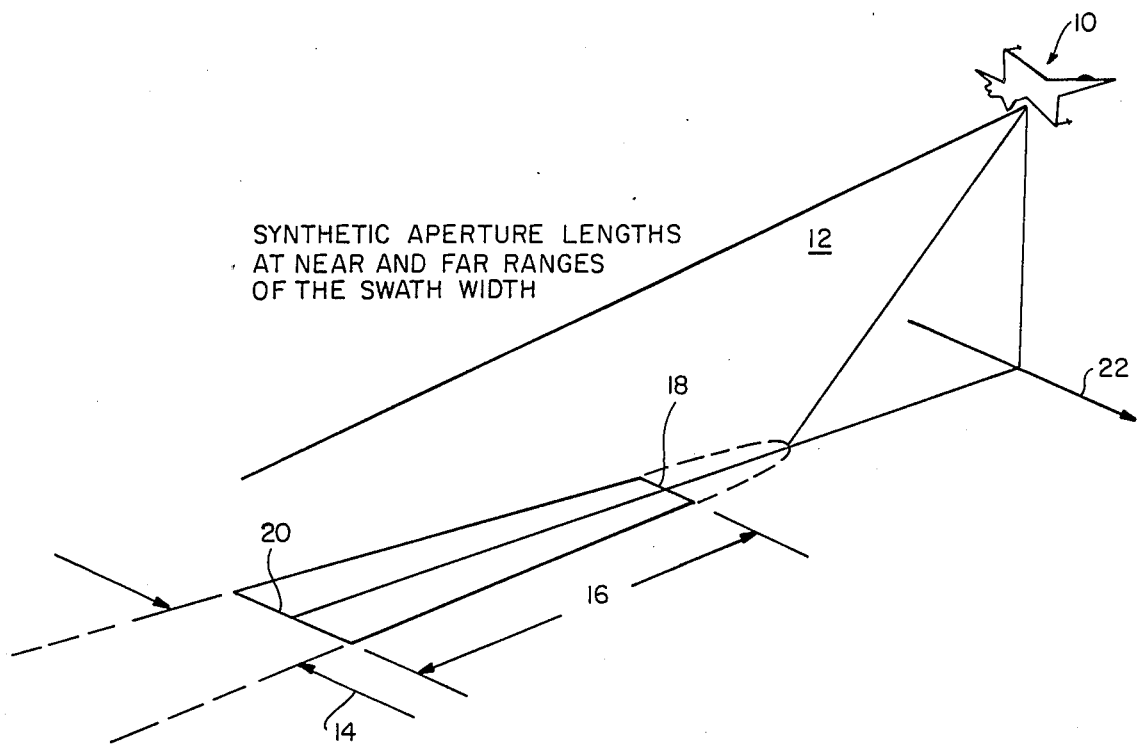
FIG. 1 is a schematic illustration of a sidelooking SAR radar showing the 3dB portion of the radar beam and swath width in relation to the radar platform ground track.
Figure 2:
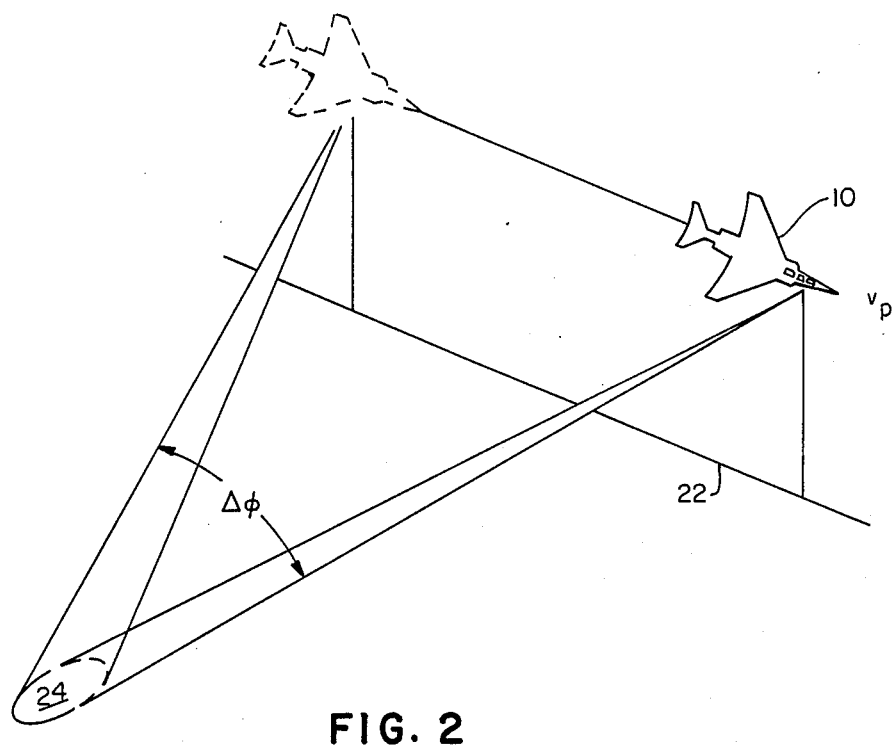
FIG. 2 is a schematic illustration of a spotlight SAR technique.
Figure 3:
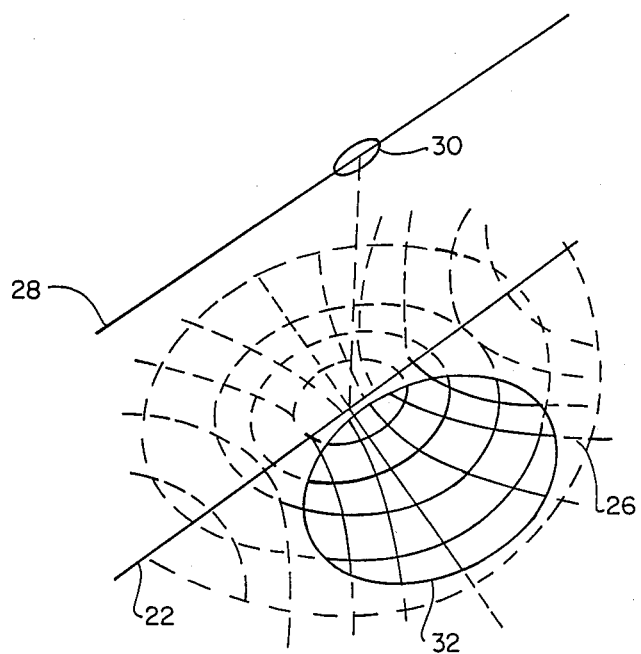
FIG. 3 is a schematic diagram of SAR range/Doppler coordinates.
Figure 4:
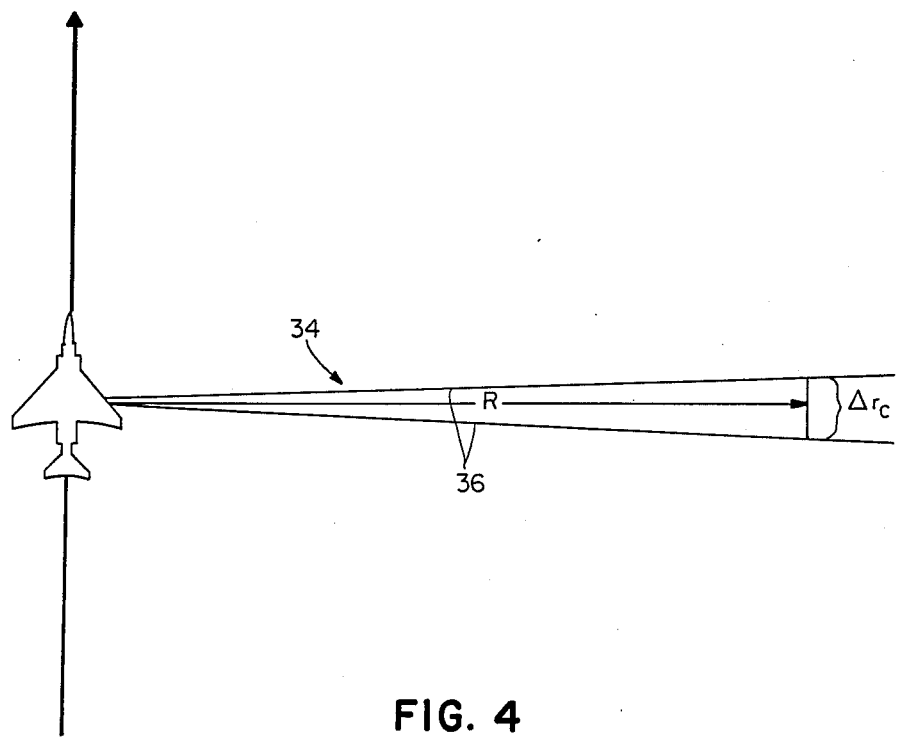
FIG. 4 is a schematic illustration of a real-aperture mapping radar operating in the sidelooking mode.
Figure 10:
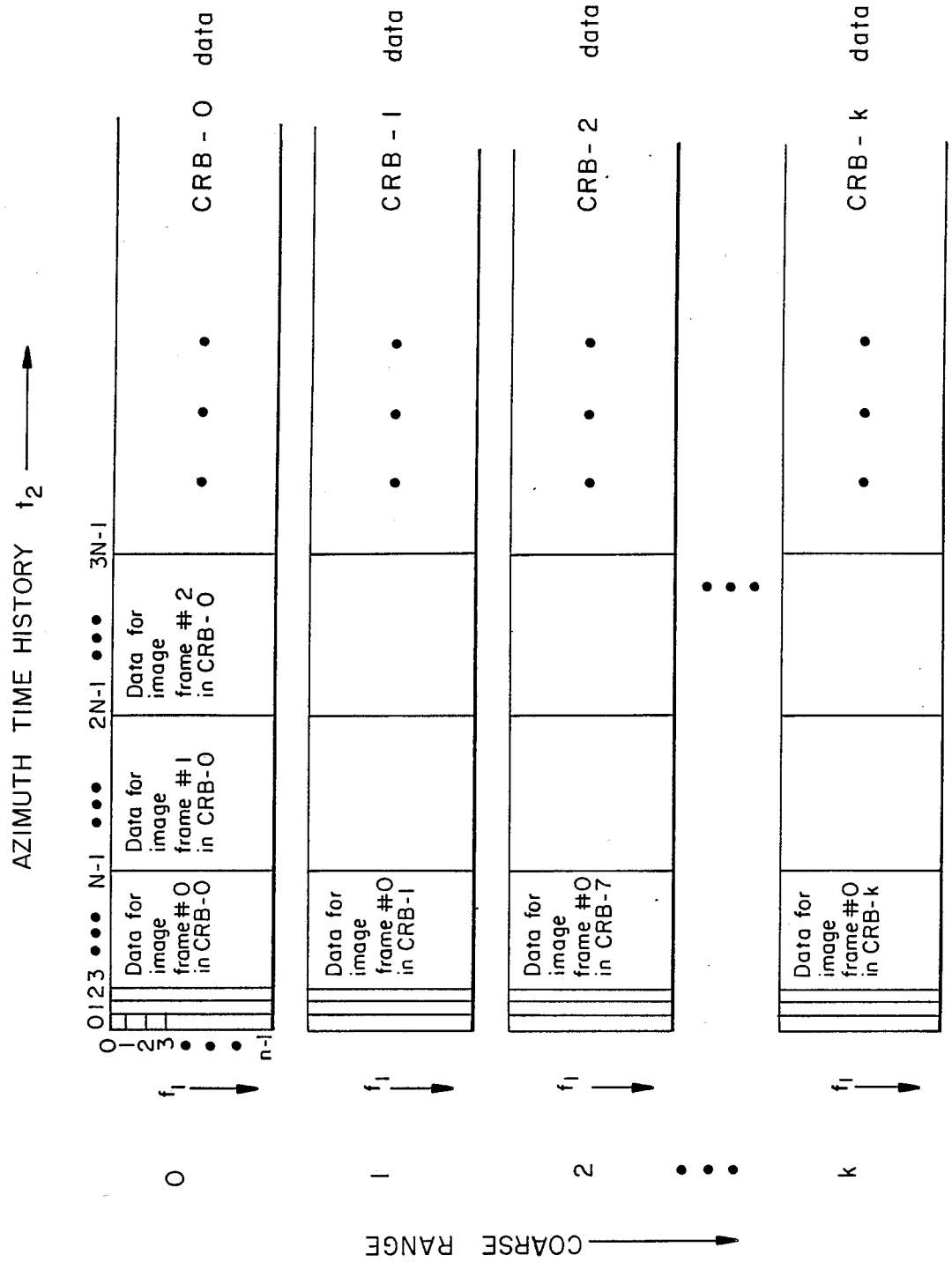
FIG. 10 is an illustration of a data collection set of N bursts of n samples of reflectivity taken in each of k coarse range bins in accordance with the present invention.
Figure 11:
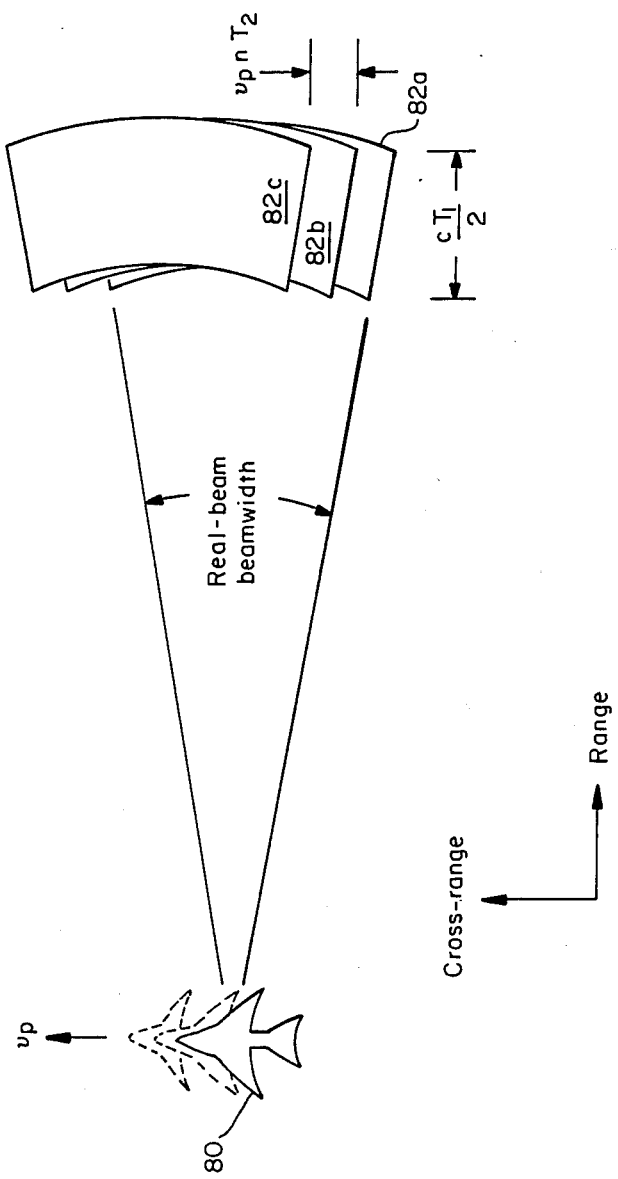
FIG. 11 is a schematic illustration of ground patch sources of reflectivity at the start of three bursts in accordance with the "map mode" of the present invention for one coarse range bin.
Figure 12:
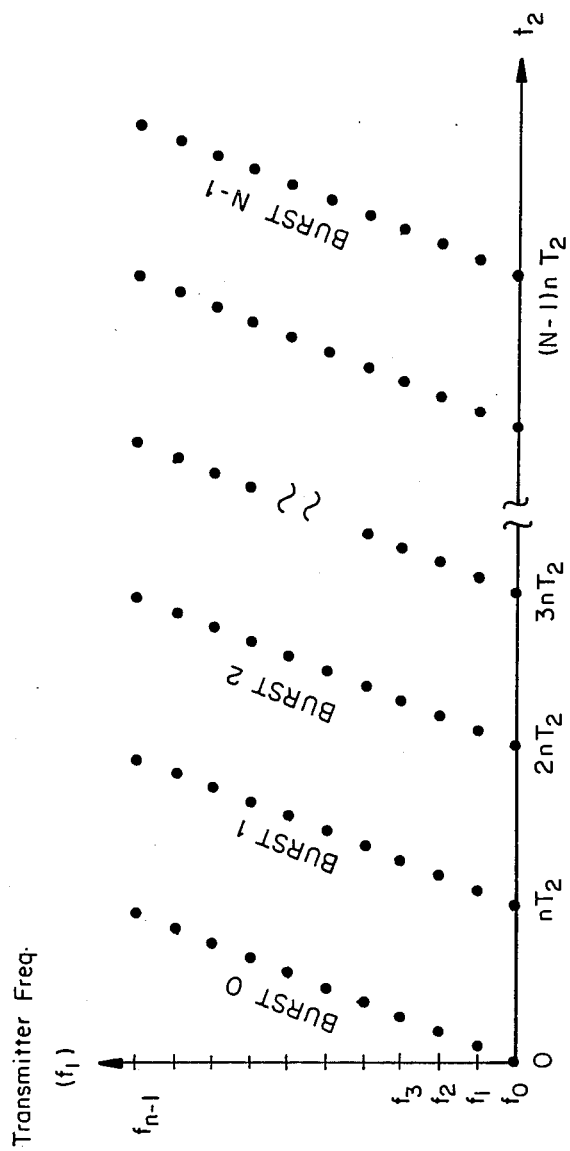
FIG. 12 is a graph of data collection coordinates in accordance with the present invention for one image frame in one coarse range bin in terms of transmitter frequency versus time.

Processing is carried out on the continuous series of N bursts of n frequency-domain samples of reflectivity taken in each of k coarse range bins (CRB) as indicated in FIG. 10. SAR map data is collected as the radar platform 80 travels a straight line as shown for one coarse range bin in FIG. 11. Data collected for a given coarse range bin arrives from slightly different patches 82a, 82b and 82c of the earth for each transmitted pulse. The view angle presented to the radar by every scatterer on the earth's surface constantly changes while it is being illuminated by the real antenna beam. FIG. 2 illustrates the data collection in terms of frequency $f_1$ versus time history $t_2$ for one image frame in one coarse range bin. Each dot represents a frequency/time-history position where one in-phase/quadrature-phase pair of samples is collected.

Figure 13:
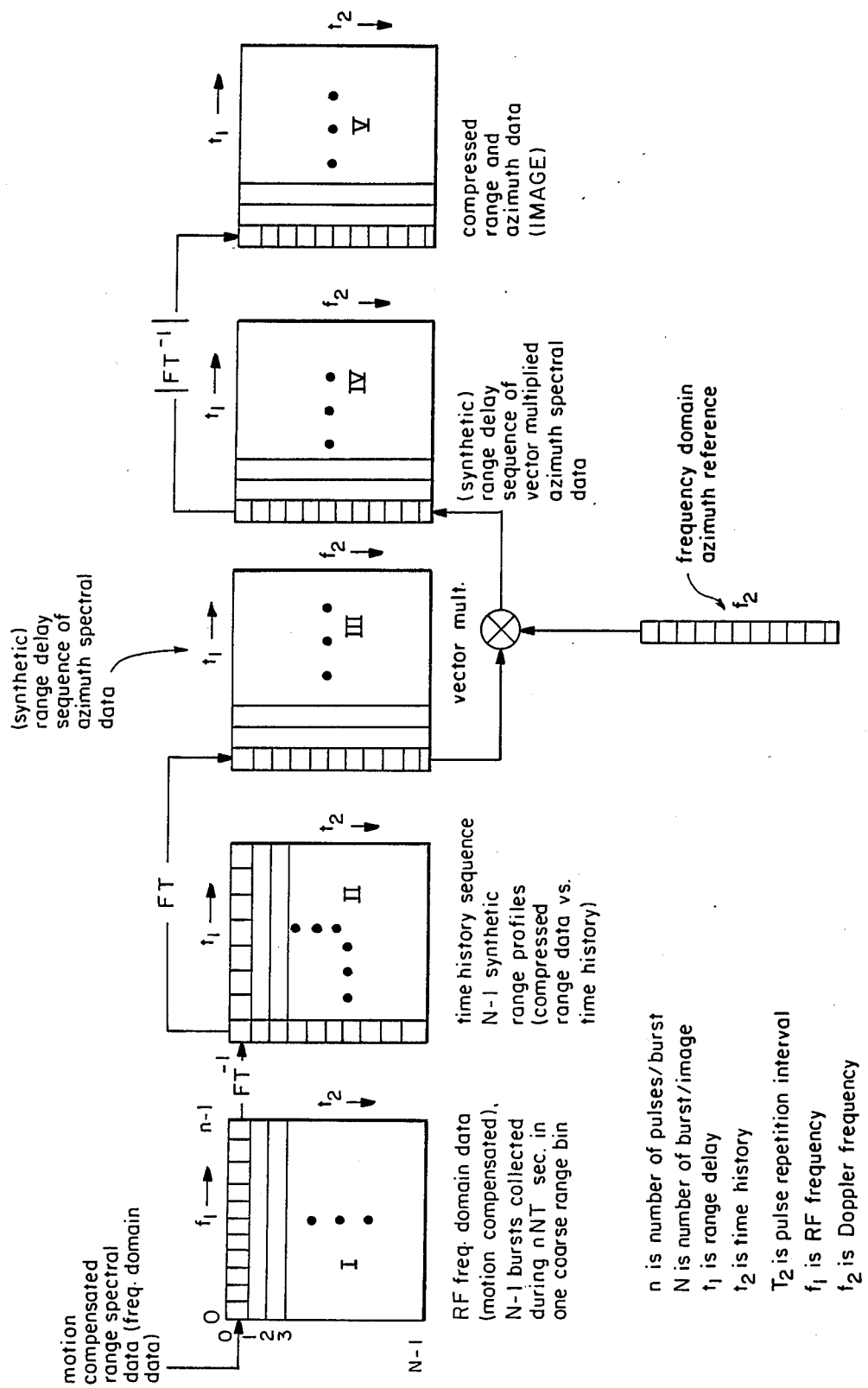
FIG. 13 is a schematic of the signal processing technique of the present invention for one SAR image in one coarse range bin.

Processing is illustrated for the SAR mapping mode in FIG. 13. Illustrated is the processing required to generate an N by n element map from N bursts of n pulses sampled in one coarse range bin. The first matrix I represents the N by n set of two-dimensional frequency-domain data that is to be processed into one azimuth section of a SAR may in one coarse range bin. The first step is to inverse discrete Fourier transform each burst of frequency-domain data into a synthetic range profile. The result is the series of synthetic range profiles (range lines) shown in matrix II. Azimuth compression is now carried out using the Fast Correlation theorem. The first step of fast correlation is to discrete Fourier transform time history data lines for each synthetic range cell into Doppler spectral data (azimuth spectrum). The set of azimuth spectral lines appears in matrix III. Azimuth spectral lines are now vector multiplied by the frequency-domain form of an azimuth reference, which corresponds to the point target response at the range of the coarse range bin being processed. Vector multiplication results in a series of azimuth-compressed data lines in the spectral domain, one line for each synthetic range cell in matrix IV. The final step is to inverse discrete Fourier transform each azimuth spectral line back to the time history domain. Absolute values for each complex value are computed for each azimuth line to form matrix V. This is the map section generated from data collected in one coarse range bin during $nNT_2$ seconds of beam illumination over $n\Delta f$ Hz of bandwidth. In summary the set of frequency-domain lines in matrix I are transformed into high resolution range lines in matrix II. The resulting azimuth time history lines are then compressed by correlation with a frequency-domain version of an azimuth reference using vector multiplication in the spectral domain. Absolute values of the compressed azimuth lines form matrix IV.

Other sections of the SAR map are generated in the same way from image-frame data collected at adjacent azimuth sections and at the adjacent coarse range positions of FIG. 10. A composite map is made by combining individual map frames.

Once a target is selected in the low resolution SAR mapping mode the real beam of the antenna is directed to track the target for a dwell time long enough to obtain the desired cross-range resolution. At the same time the frequency step size $\Delta f$ is increased to produce an equivalent slant-range resolution. The resulting data set is then processed as shown in FIG. 14.

Figure 14:
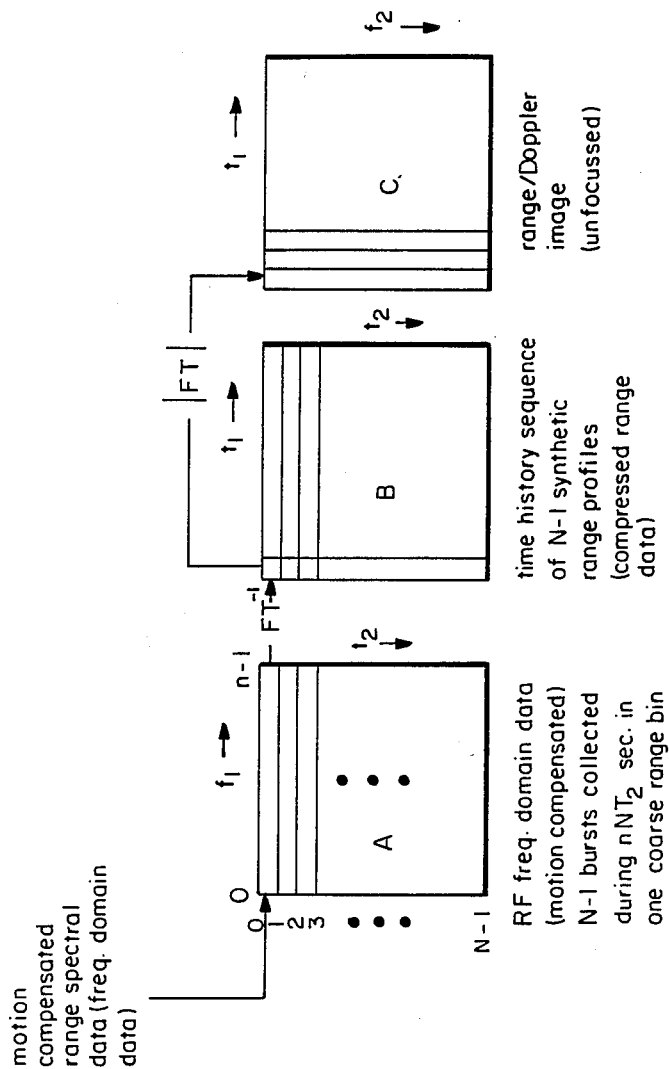
FIG. 14 is a schematic of the "zoom" mode signal processing of the present invention.
Figure 15:
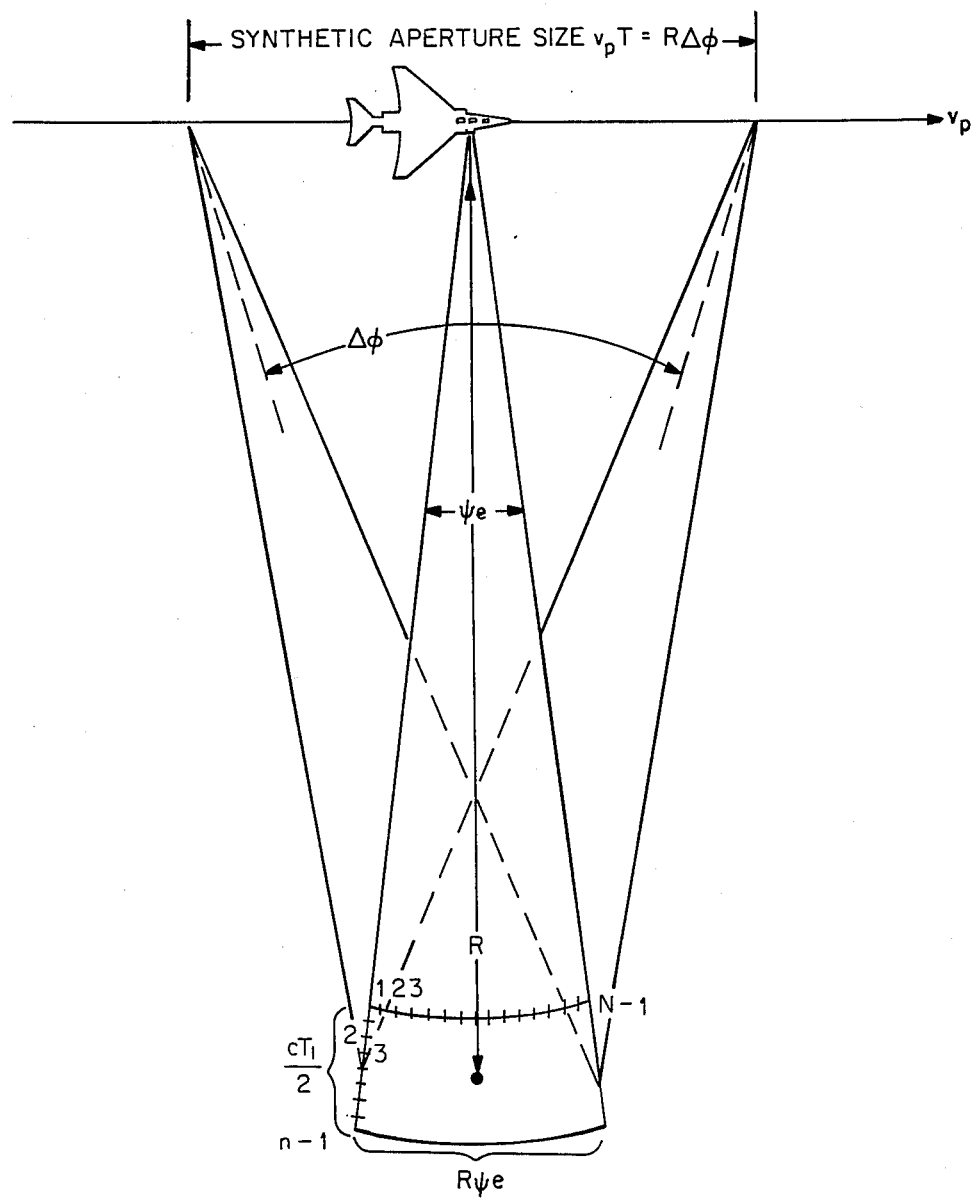
FIG. 15 is a schematic illustration of spotlighting in the "zoom" mode of the present invention.
Figure 16:
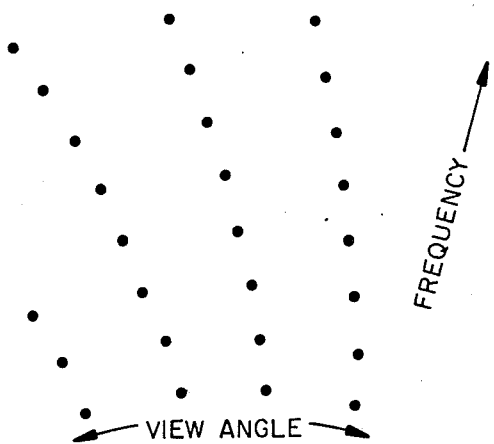
FIG. 16 is a schematic of data collection coordinates for the spotlight "zoom" mode of the present invention.

The first matrix A in FIG. 14 is a set of motion compensated lines of frequency-domain data collected as the target area is tracked as shown in FIG. 15 for $v_p T_2$ seconds. FIG. 16 illustrates polar position of data points collected as the target view angle changes. Frequency-domain lines are discrete Fourier transformed into synthetic range profile lines, as for the SAR map mode, to generate the second matrix B in FIG. 14. In contrast to the SAR mapping mode there is no azimuth reference to which the resulting azimuth time history data lines can be correlated. Therefore azimuth lines are transformed from the time domain to the Doppler frequency domain to form the image directly. Absolute values of the resulting transform form the range/Doppler image as shown in matrix C of FIG. 14. The image matrix C of FIG. 14 is unfocussed. When large view angle segments of data collection are required to achieve the needed resolution focussing procedures need to be applied. The large view angle segments of data collection result in a polar formatted data set that deviates significantly from the rectangular format that would result in a focussed image following the two one-dimensional discrete Fourier Transforms of FIG. 14. The problem is illustrated in FIG. 17, which also indicates that for a given resolution the problem is aggravated at lower frequency bands.

Figure 17:
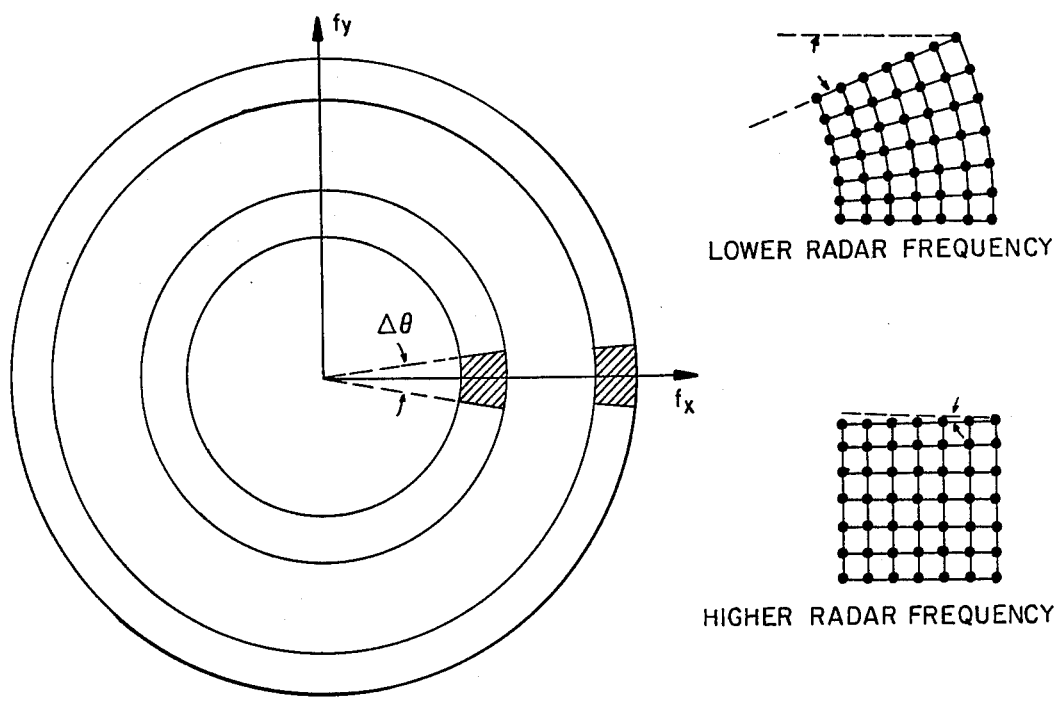
FIG. 17 is a schematic of the effect of frequency band and view angle on deviation from a rectangular data collection.
Figure 18:
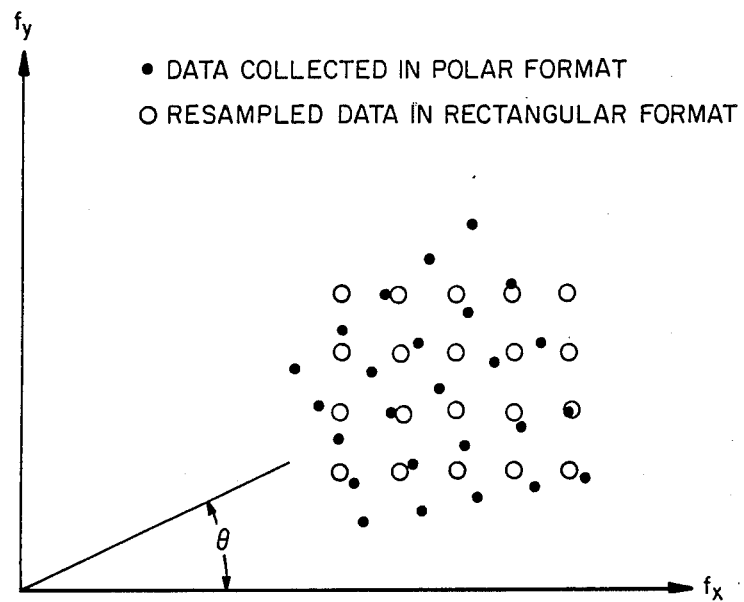
FIG. 18 is a graph illustrating reformatting from polar to rectangular coordinates.

Quantities $f_x$ and $f_y$ in FIG. 17 are spatial frequency coordinates defined as:

$$f_x = \frac{2f}{c} \cos \theta$$

$$f_y = \frac{2f}{c} \sin \theta$$

where $\Theta$ is the view angle measured from the $f_x$ axis and f is the RF frequency measured in the radial dimension. FIG. 18 illustrates how data collected in polar format (frequency versus view angle) is reformatted into a spatial frequency format ($f_x$ vs. $f_y$). Polar to rectangular reformatting, if required, would be carried out on the data in matrix I of FIG. 14.

RADAR SYSTEM PARAMETERS, DERIVATIONS AND OPERATION

The synthetic slant-range resolution is:

$$\Delta r_s = \frac{c}{2} \; \frac{1}{n\Delta f} \quad (1)$$

The slant-range ambiguity window is:

$$W_s = \frac{c}{2} \; \frac{1}{\Delta f} = \frac{c}{2} \; \frac{n}{n\Delta f}$$

The slant-range depth over which target scatterers are coherently integrated, i.e., slant-range integration window, is $$\overline{W}_s = \frac{cT_1}{2}.$$

For $\overline{W}_s > W_s$ foldover will occur caused by integration of scatterers outside the unambiguous range window. For $\overline{W}_s < W_s$ the echo will contain integrated energy from a range depth smaller than the slant-range ambiguity window.

The matched condition, where the integration window $\overline{W}_s$ equals the ambiguity window $W_s$ in slant-range, is $\overline{W}_s = W_s$. Then $$\frac{cT_1}{2} = \frac{c}{2} \; \frac{n}{n\Delta f} \quad (2)$$

Solving for pulse width $$T_1 = 1/\Delta f \quad (3)$$

corresponding to ambiguous step size the number of pulses n per burst for the matched condition becomes $$n = \frac{cT_1}{2\Delta r_s} \quad (4)$$

Resolution in the cross-range or azimuth dimension is obtained as in conventional SAR systems by processing the data from each range cell at the burst rate. The cross-range resolution in a sidelooking mode, shown in FIG. 11., is expressed in terms of dwell time wavelength as for conventional SAR for which $$\Delta r_c = \frac{1}{2} \; \frac{\lambda}{\omega T} = \frac{1}{2} \; \frac{\lambda}{\psi}$$

where $\lambda$ is wavelength, T is dwell time, $\omega$ is angular velocity of the scatterer and $\Omega$ is the equivalent rectangular antenna beam width. In any case, the cross-range resolution is independent of range but the dwell time required to achieve this resolution is proportional to range as for focused SAR.

The unambiguous cross-range window $W_c$ is determined from the maximum Doppler bandwidth and the azimuth sampling rate. For radar platform velocity component $v_p$ tangential to the target at range R the Doppler bandwidth associated with the cross-range window $W_c$ regardless of radar waveform is $$\beta_D = \frac{2v_p}{\lambda R} W_c.$$

The azimuth sampling rate in a coarse range bin of interest is one complex sample each burst. For integration time T and a total of N bursts the sampling rate is N/T and the Nyquist criterion requires $$\frac{N}{T} \geq \frac{2v_p}{\lambda R} W_c.$$

In terms of cross-range window $$W_c = \frac{1}{2} \; \frac{R\lambda}{v_p T} N. \quad (5)$$

The maximum cross-range integration window at range R in a sidelooking mode is $\overline{W}_c = R\Omega$ as for pulse compression SAR.

For $W_c < \overline{W}_c$ scatterers at the edges of the antenna beam would be undersampled. For $W_c > \overline{W}_c$ resolution will be less than $\Delta r_c$. The matched situated, where the integration window $\overline{W}_c$ equals the ambiguity window $W_c$ in cross-range, is $\overline{W}_c = W_c$.
for this situation $$R\psi = \frac{1}{2} \frac{R\lambda}{v_p T} N = \frac{1}{2} \frac{\lambda}{\omega T} N = \frac{1}{2} \frac{\lambda}{\psi} N.$$

Thus, the required number of bursts N (the number of synthetic range profiles) to match cross-range integration length $\overline{W}_c$ to cross-range ambiguity window $W_c$ for sidelooking frequency agile SAR is $$N = \frac{2R\psi^2}{\lambda}. \quad (6)$$

The cross-range and slant-range resolution can be matched to obtain "square", resolution, i.e. to achieve an undistorted map.

Expressions will now be developed for required bandwidth and PRF for this condition with $T_1 = 1/\Delta f$ and burst rate matched to resolution. For a PRI of $T_2$ seconds, the burst rate is $$f_b = \frac{N}{T} = \frac{N}{nNT_2} = \frac{1}{nT_2}$$

Substituting for n from Equation (4) (based on $T_1 = 1/\Delta f$) yields $$f_b = \frac{2}{c} \frac{\Delta r_s}{T_1 T_2}.$$

For platform velocity $v_p$ the platform cross-range travel between bursts (azimuth sampling resolution) is $$\overline{\Delta}r_c = \frac{v_p}{f_b} = \frac{c}{2} \frac{v_p T_1 T_2}{\Delta r_s}$$

so that required PRF becomes $$\frac{1}{T_2} = \frac{cv_p T_1}{2\Delta r_s \Delta r_c}. \quad (7)$$

The cross-range resolution $\Delta r_c$ will be realized unambiguously if $\overline{\Delta}r_c \leq \Delta r_c$.

The cross-range travel per burst for the matched condition is $$\overline{\Delta}r_c = \Delta r_c = \frac{1}{2} \frac{\lambda}{\psi}.$$

Then with slant-range resolution $\Delta r_s$ from equation (1) required PRF given in equation (7) becomes $$\frac{1}{T_2} = \frac{cv_p T_1}{2 \frac{c}{2} \frac{1}{n\Delta f} \cdot \frac{1}{2} \frac{\lambda}{\psi}}$$

$$= \frac{2 n\Delta f T_1 v_p}{\lambda}$$

Required PRF for $\overline{\Delta}r_c = \Delta r_c$ and $T_1 = 1/\Delta f$ is $$PRF = \frac{1}{T_2} = \frac{2 nv_p\psi}{\lambda}.$$

The foregoing analysis for frequency agile SAR has developed the relationship between radar system parameters associated with one image frame of sidelooking FASAR at some range R and a constant PRF. Multiple range samples to increase the swath width to multiples of $(cT_1)/2$ must be considered for an actual system. At other range sample positions both the number of frequency steps per burst and burst rate remain fixed but the number N of bursts processed to make up image frames at each sampled range gate will increase with range according to equation (6) to provide a constant cross-range resolution. Thus, the data collection time required is range dependent for maps composed of more than one range integration length $(cT_1)/2$.

Frequency agile SAR zoom capability in a spotlight mode, is illustrated in FIG. 13. Spotlighting can be achieved as in pulse compression SAR by first selecting a particular image element for spotlighting, then range and angle tracking this element to obtain longer dwell time for increased cross-range resolution. At the same time the frequency agile bandwidth n f is increased to provide corresponding increased slant-range resolution. The resulting increased cross-range resolution is, $$\Delta r_c = \frac{1}{2} \frac{\lambda}{\omega T} = \frac{1}{2} \frac{\lambda R}{v_p T}. \quad (8)$$

where T is the coherent integration time during which the image element of interest is spotlighted. The unambiguous cross-range window size in the spotlight mode as for sidelooking is proportional to Doppler spread produced by the platform's angular rotation rate $R/v_p$ about the target area. From Equation (8) the unambiguous range window $N\Delta r_c$ is $$W_c = \frac{1}{2} \frac{R\lambda}{v_p T} N$$

as in Equation (5) the SAR sidelooking mode.

Nyquist sampling in a frequency agile SAR spotlight mode, illustrated in FIG. 13 requires the number of pulses n per burst to be equal to $$\frac{cT_1}{2} \frac{1}{\Delta r_s}$$

as in the sidelooking SAR mode. The required bandwidth for square resolution as for the sidelooking mode, is obtained from $$\Delta r_s = \Delta r_c$$

where, as in the sidelooking SAR mode, $$\Delta r_s = \frac{c}{2} \frac{1}{n\Delta f}$$

and from Equation (8)

$$\Delta r_c = \frac{1}{2} \frac{\lambda R}{v_p T}$$

so that the required bandwidth for square resolution becomes $$n\Delta f = \frac{cv_p T}{R\lambda} = \frac{c\Delta\phi}{\lambda}$$

An advantage of the frequency agile SAR spotlighting concept is that continuous square resolution zoom capability is convenient. The frequency agile synthesizer 44 is simply programmed to produce the frequency agile bandwidth $n\Delta f$ determined from the above expression. Thus if, while in the real-time sidelooking mode, a target of interest is observed, the zoom capability can be implemented to magnify the target. To do this the target of interest is tracked in range and bearing while bandwidth $n\Delta f$ is increased accordingly to produce slant-range resolution equal to the increased cross-range resolution in the single range bin under track.

Expressions for slant-range resolution, integration length and ambiguity lengths for spotlight FASAR are identical to those for sidelooking frequency agile SAR. Expressions in Table 1 for cross-range resolution for both the spotlight and sidelooking modes are expressed identically to those for pulse compression SAR. It should be noted that for spotlight SAR the quantity $\Delta\phi$ is the integration angle. The unambiguous PRF for frequency agile SAR for either sidelooking or spotlight modes differs from that for pulse compression SAR by a factor of n where n is the number of pulses per burst. While frequency agile SAR would seem, therefore, to require much higher PRF the pulse-to-pulse frequency separation may allow operation in the otherwise range ambiguous region of PRF. Table 1 lists the above derived equations for frequency agile SAR.

Zoom control spotlighting is performed by simultaneously adjusting frequency agile bandwidth to produce a synthetic slant-range resolution equal to the cross-range resolution resulting from the planned target dwell time. In sidelooking frequency agile SAR there are k sets of $n \times N$ image elements spread over the desired swath width. In frequency agile SAR each of the N groups of complex numbers is made up of the sampled and digitized echoes from the burst of n pulses. In pulse compression SAR each of the N groups of complex numbers is made up of the n sampled and digitized echoes associated with an element range extent equal to the transmitted pulse width. FIG. 8 illustrates sampling for frequency agile SAR when the PRF corresponds to unambiguous range, i.e., PRF$\leq$c/(2R) FIG. 9 illustrates samplinq when PRF$\geq$c/(2R) echo foldover is avoided by inherent frequency separation between pulses so that the PRF can be made high enough to avoid synthetic aperture grating lobes.

TABLE 1
Summary of FASAR Equations

| Parameter | Symbol | Expressions Sidelooking | Spotlight |
|---|---|---|---|
| slant-range resolution | $\Delta r_s$ | $c/2n\Delta f$ | $c/2n\Delta f$ |
| slant-range ambiguity length | $W_s$ | $n\Delta r_s = c/2\Delta f$ | $n\Delta r_s = c/2\Delta f$ |
| slant-range integration length | $\overline{W}_s$ | $cT_1/2$ | $cT_1/2$ |
| cross-range resolution | $\Delta r_c$ | $\frac{1}{2}\frac{\lambda}{\omega T} = \frac{1}{2}\frac{\lambda}{\psi} = \frac{l}{2}$ (1) | $\frac{1}{2}\frac{\lambda}{\omega T} = \frac{1}{2}\frac{\lambda}{\Delta\phi} = \frac{1}{2}\frac{R\lambda}{v_p T}$ |
| cross-range ambiguity length | $W_c$ | $N\Delta R_c = \frac{NR\lambda}{2v_p T} = \frac{1}{2}\frac{R\lambda}{v_p}\frac{1}{nT_2} = \frac{Nl}{2}$ | $NR_c = \frac{NR\lambda}{2v_p T} = \frac{1}{2}\frac{R\lambda}{v_p T} = \frac{1}{2}\frac{\lambda}{\Delta\phi}N$ (3) |
| cross-range (2) integration length | $\overline{W}_c$ | $R\psi = R\frac{\lambda}{l}$ (1) | $R = \frac{\lambda}{l}$ |
| pulses per burst for $\overline{W}_s = W_s$ | n | $\frac{cT_1 1}{\Delta 2r_s} = T_1(n\Delta f)$ | $\frac{cT_1 1}{2\Delta r_s} = T_1(n\Delta f)$ |
| bursts per image for $\overline{W}_c = W_c$ | N | $\frac{2R\psi^2}{\lambda}$ | $\frac{2R\psi\Delta\phi}{\lambda}$ |
| minimum PRF (2) | $\frac{1}{T_2}$ | $n\frac{2v_p}{l}$ (1) | $n\frac{2v_p}{l}$ (3) |
| pulse width for $\overline{W}_s = W_s$ | $T_1$ | $1/\Delta f$ | $1/\Delta f$ |
| required bandwidth for $\Delta r_s = \Delta r_c$ | $n\Delta f$ | $\frac{c\psi}{\lambda} = \frac{c}{l}$ (1) | $\frac{c\Delta\phi}{\lambda} = \frac{cTv_p}{\lambda R}$ (3) |
| synthetic aperture | f | $R\psi$ | $R\Delta\phi$ |

(1) Applies when integration is carried out on entire illumination length available from a real antenna of length
(2) For small integration angle and small beamwidth
(3) Assumes that $v_p$ is the tangential component of velocity relative to illuminated area to be mapped

I claim:
1. In a synthetic aperture radar system the improvement comprising:
   means for transmitting a radar signal comprised of a series of N bursts with n pulses per burst wherein reach of said n pulses is a different frequency, where N and n are integers; and means for taking a plurality of samples of echo signals from each of said n pulses in each said burst and for using all of said plurality of samples to generate a radar image.

2. The improvement of claim 1 wherein:

each of said n pulses is a fixed frequency step $\Delta f$ either above or below one of the other of said n pulses.

3. The synthetic aperture radar system of claim 1 wherein:

said n pulses comprise an ordered set of pulses and said radar signal is a random permutation of said ordered set.

4. In a synthetic aperture radar system including means for transmitting a radar signal for reflecting off of a target so as to create echo signals and including means for receiving radar echo signals wherein the improvement comprises:

first means for increasing the target dwell time of said means for transmitting by spotlighting on a target area of interest; and second means for increasing the frequency bandwidth of said radar signal simultaneously with an increase in said dwell time by said first means.

5. The synthetic aperture radar system of claim 4 wherein:

said radar signal is comprised of a series of N bursts, each of said N bursts comprising n pulses, where N and n are integers, and where each of said n pulses is a different frequency.

6. The synthetic aperture system of claim 5 wherein:

said n pulses comprise an ordered set of pulses and said radar signal is a random permutation of said ordered set.

7. The synthetic aperture radar system of claim 4 wherein:

said means for increasing the target dwell time comprises means for angle tracking said target area of interest.

8. A method of performing synthetic aperture radar mapping comprising the steps of:

transmitting from a moving platform N bursts of n radar pulses each, where N and n are integers;

receiving a set of echo signals from each of said n pulses to thereby receive a plurality of sets of echo signals for each said burst;

converting each member of said sets of echo signals to an echo signal value to thereby form a plurality of sets of echo signal values;

for each of a plurality of range bins computing the inverse discrete Fourier transform of each said set of echo signal values for each said bursts to thereby create a synthetic range profile for each burst and to create a plurality of synthetic range cells;

performing a Fourier transform of each synthetic range cell to create a plurality of sets of azimuth spectral lines;

vector multiplying by an azimuth reference value each of said plurality of azimuth spectral lines to create a set of azimuth compressed data lines;

performing an inverse Fourier transform on each said azimuth spectral line to generate a matrix of map values;

generating a map using said matrix of map values.

9. The method of claim 8 wherein said steps of performing a Fourier transform and an inverse Fourier transform comprise the steps of performing a discrete Fourier transform and inverse discrete Fourier transform, respectively.

* * * * *